United States Patent
Bauer

(10) Patent No.: US 8,316,885 B2
(45) Date of Patent: Nov. 27, 2012

(54) FLUID SUPPLY SYSTEM, ESPECIALLY FOR DELIVERING LIQUID HYDROCARBON TO A FUEL-OPERATED VEHICLE HEATER OR TO A REFORMER

(75) Inventor: Thomas Bauer, Dettingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 372 days.

(21) Appl. No.: 12/617,867

(22) Filed: Nov. 13, 2009

(65) Prior Publication Data

US 2010/0122731 A1    May 20, 2010

(30) Foreign Application Priority Data

Nov. 17, 2008  (DE) .......................... 10 2008 057 636

(51) Int. Cl.
*E03B 5/00* (2006.01)
*F04F 5/02* (2006.01)
*F16K 11/065* (2006.01)
*F02M 37/04* (2006.01)

(52) U.S. Cl. .............. 137/565.22; 137/565.34; 137/563; 137/625.25; 137/625.65; 137/888; 123/509; 123/511; 123/514

(58) Field of Classification Search ............ 137/565.22, 137/565.34, 888, 889, 511, 563, 625.25, 137/625.65; 123/509, 511, 514
See application file for complete search history.

(56) References Cited

U.S. PATENT DOCUMENTS

| 2,989,957 | A | * | 6/1961 | Means ......................... 123/495 |
| 4,170,279 | A | * | 10/1979 | Pelletier ....................... 188/300 |
| 6,050,239 | A | * | 4/2000 | Frankle et al. ................ 123/320 |
| 6,276,342 | B1 | | 8/2001 | Sinz et al. |

FOREIGN PATENT DOCUMENTS

| DE | 102004050121 | | 4/2006 |
| DE | 102005060793 | | 6/2007 |
| DE | 102006017123 | A1 | 10/2007 |
| EP | 0 979 939 | A2 | 2/2000 |

* cited by examiner

*Primary Examiner* — John Rivell
*Assistant Examiner* — Atif Chaudry
(74) *Attorney, Agent, or Firm* — McGlew and Tuttle, P.C.

(57) ABSTRACT

A fluid supply system is provided, especially for delivering liquid hydrocarbon to a fuel-operated vehicle heater or to a reformer. The system includes a fluid reservoir (12), a first fluid line (28) from the fluid reservoir (12) to an on-off valve (30), a second fluid line (32) from the on-off valve (30) to a first system area (14) to be fed with fluid, and a third fluid line (34) from the on-off valve (30) to the reservoir (12). The on-off valve (30) establishes a connection between the first fluid line (28) and the second fluid line (32) in a first valve position and establishes a connection between the second fluid line (32) and the third fluid line (34) in a second valve position. A first fluid delivery arrangement (26) is provided for delivering fluid from the reservoir (12) into the second fluid line (12). A second fluid delivery arrangement (20, 24) is provided for delivering fluid from the third fluid line (34) into the reservoir (12).

17 Claims, 1 Drawing Sheet

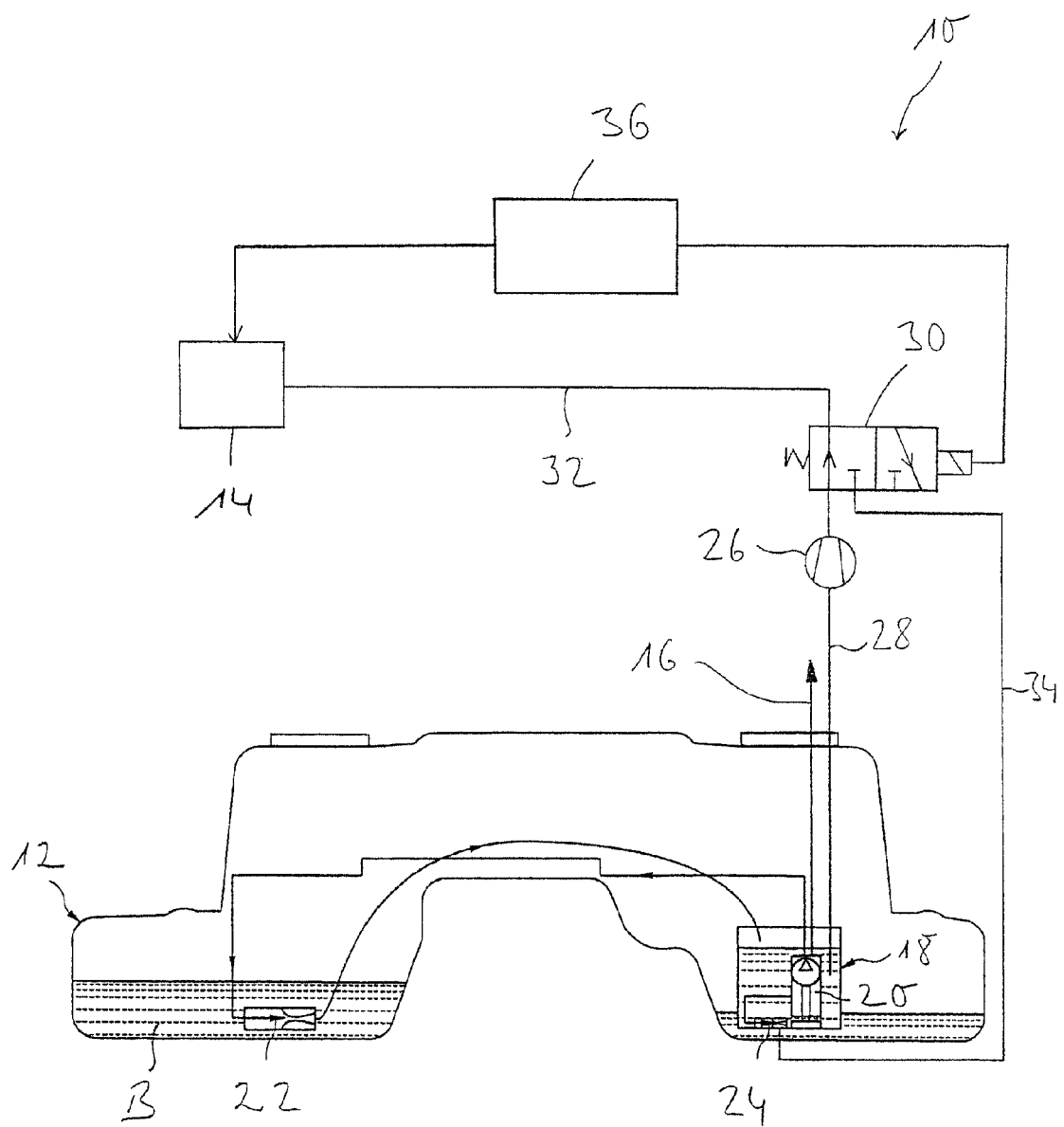

FLUID SUPPLY SYSTEM, ESPECIALLY FOR DELIVERING LIQUID HYDROCARBON TO A FUEL-OPERATED VEHICLE HEATER OR TO A REFORMER

CROSS REFERENCE TO RELATED APPLICATIONS

This application claims the benefit of priority under 35 U.S.C. §119 of German Patent Application DE 10 2008 057 636.0 filed Nov. 17, 2009, the entire contents of which are incorporated herein by reference.

FIELD OF THE INVENTION

The present invention pertains to a fluid supply system, which can be used to deliver in a vehicle liquid hydrocarbon, i.e., for example, diesel fuel or gasoline, to a first system area, which is to be fed therewith, and which system area may be provided, for example, by a vehicle heater or a reformer. It is problematic during the operation of such system areas especially at the beginning of the operation if no hydrocarbon is available at the necessary time or hydrocarbon is fed already too early and supersaturation is present. An excessive supply of hydrocarbon leads to increased pollutant emission especially at the start of combustion. Such undefined delivery states may occur because it cannot be ruled out, especially after a longer stop period, that the line leading from the reservoir to the system area to be fed has become emptied at least partially because of various effects. This line may be drained off, for example, due to the force of gravity, it may partially become empty due to thermal expansion of the fuel contained therein or it may lose fuel or hydrocarbon due to diffusion through the wall of the line.

BACKGROUND OF THE INVENTION

A heater to be operated with liquid fuel in a vehicle is known from DE 10 2004 050 121 A1. A fluid supply system, which delivers the liquid fuel as a fluid between a reservoir and the heater, is associated with this heater. The system comprises a first fluid line leading to an on-off valve, a valve line leading from the on-off valve to the heater and a third valve line returning from the on-off valve to the reservoir. The on-off valve can be brought into two valve positions. In a first valve position, it connects the first fluid line to the second fluid line, so that the liquid fuel is delivered via the on-off valve to the heater by a fuel pump arranged in the first fluid line, while the third fluid line is closed. In a second valve position, the on-off valve closes the second fluid line and establishes a connection between the first fluid line and the third fluid line, so that a fluid circuit is formed, which comprises the first fluid line with the fluid pump located therein, the on-off valve, the third fluid line and the reservoir. An attempt is made in this manner to create defined conditions at the beginning of a combustion operation.

DE 10 2005 060 793 A1 discloses a fuel supply system, in which the liquid fuel contained as a fuel in a fuel reservoir is delivered via a fuel pump to a system area that is to be fed, i.e., an internal combustion engine. Two sucking jet pumps, into which branch lines branching off from the fuel pump lead, are associated with this fuel pump. During its operation, the fuel pump delivers fuel not only to the internal combustion engine, but also to the two sucking jet pumps, which deliver liquid fuel as a consequence of this into a swirl pot contained in the reservoir. The fuel pump takes the liquid fuel to be delivered to the internal combustion engine from this swirl pot.

SUMMARY OF THE INVENTION

The object of the present invention is to provide a fluid supply system and a process for operating same, with which fluid supply system and process improved defined delivery conditions can be guaranteed for the system area to be fed with fluid.

According to a first aspect, this object is accomplished by a fluid supply system, especially for delivering liquid hydrocarbon to a fuel-operated vehicle heater or to a reformer, comprising a fluid reservoir, a first fluid line from the fluid reservoir to an on-off valve, a second fluid line from the on-off valve to a first system area to be fed with fluid, and a third fluid line from the on-off valve to the reservoir, wherein the on-off valve establishes a connection between the first fluid line and the second fluid line in a first valve position and establishes a connection between the second fluid line and the third fluid line in a second valve position, and also comprising a first fluid delivery arrangement for delivering fluid from the reservoir into the second fluid line, as well as a second fluid delivery arrangement for delivering fluid from the third fluid line into the reservoir.

The two fluid delivery arrangements are operated in the fluid supply system according to the present invention, on the one hand, in order to deliver fluid to the first system area to be fed, i.e., for example, a vehicle heater, and to empty the second fluid line leading to this system area. It can thus be ensured that a quantity of fluid that ensures that the volume of the second fluid line is again filled up is delivered at first during the subsequent start of delivery in case of a second fluid line emptied in a defined manner, without fluid already escaping to the first system area to be fed.

The first fluid delivery arrangement is preferably arranged in the first fluid line and may be designed, for example, as a so-called metering pump.

The second fluid delivery arrangement may be arranged such that it takes up fluid from the third fluid line, i.e., it is consequently arranged essentially at the end of that line, and then releases the fluid to the reservoir.

It is advantageous if at least the second fluid delivery arrangement is already arranged in the reservoir, and the first fluid delivery arrangement may also be arranged in the reservoir for space reasons or to increase the operational reliability.

The second fluid delivery arrangement may comprise a sucking jet pump. To make it possible to operate such a sucking jet pump to take up fluid from the third fluid line, it is further proposed that the second fluid delivery arrangement comprise a main fluid delivery pump for delivering fluid from the reservoir to a second system area to be fed with fluid, wherein the sucking jet pump can deliver fluid from the third fluid line into the reservoir during the operation of the main fluid delivery pump. Such a second system area may be, for example, an internal combustion engine, which is fed by the main fluid delivery pump with fluid taken from the fluid reservoir, i.e., fuel or hydrocarbon. The sucking jet pump also becomes active during the operation of this main fluid delivery pump, so that whenever the on-off valve is also in its second valve position, i.e., the connection between the third fluid line and the second fluid line is established, fluid can be drawn off from the third fluid line and hence from the second fluid line due to the suction of the sucking jet pump.

The object mentioned in the introduction is accomplished, furthermore, by a process for operating a fluid supply system, as it was explained above, wherein the on-off valve is brought into its first valve position and the first fluid delivery arrangement is operated to deliver fluid to the first system area.

To create defined conditions for the resumption of the operation of the first system area after ending of the fluid feed to the first system area, it is further provided that after ending the delivery of fluid to the first system area, the on-off valve be brought into its second valve position and that the second fluid delivery arrangement be operated to empty at least the second fluid line.

If at least the second fluid line is then emptied, the on-off valve can again be brought into its first valve position.

To guarantee an even higher precision in fluid supply at the beginning of operation of the first system area in the fluid supply system according to the present invention or the operating process therefor, it is further proposed that the following measures be taken prior to the delivery of fluid to the first system area with the on-off valve brought into the first valve position:

a) the first fluid delivery arrangement is operated until the first fluid line up to the on-off valve and part of the second fluid line are filled with fluid, b) the on-off valve is brought into the second valve position, and the second fluid delivery arrangement is operated until at least the second fluid line is emptied essentially completely, and c) the on-off valve is brought into the first valve position, and the first fluid delivery arrangement is operated until the second fluid line is filled with fluid essentially completely.

It is ensured by this procedure that not only is a quantity of fluid that fills the volume of the first fluid line provided in a defined manner, but the full volume of the second fluid line is already filled as well.

Provisions may furthermore be made for the first fluid delivery arrangement to be operated after an interruption of operation or continuously after performing measure c) in order to feed fluid from the second fluid line into the first system area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:
FIG. 1 is a general view of a fluid supply system according to the present invention.

DESCRIPTION OF THE PREFERRED EMBODIMENTS

Referring to the drawings in particular, the fluid supply system 10 shown in FIG. 1 is used to deliver liquid fuel B contained in a reservoir or fuel tank 12 as a fluid to a vehicle heater 14 as a first system area to be fed with such a fluid or fuel. At the same time, a second system area to be fed with liquid fuel, e.g., an internal combustion engine, not shown in FIG. 1, may also be fed with the fuel B via a line 16 with this fluid supply system 10. A so-called swirl pot 18 with a fuel pump 20 in it is arranged for this in the reservoir 12. This [fuel pump 20] delivers the fuel B taken from the swirl pot 18 into line 16 and hence to the internal combustion engine, on the one hand, and to two sucking jet pumps 22, 24, on the other hand, which deliver fuel B contained in the reservoir 12 into the swirl pot 18. The sucking jet pump 24 is arranged in the swirl pot 18 itself and is open towards the reservoir 12 via a line connection or opening, not shown.

The fluid supply system 10 comprises as other essential components a fuel pump 26, designed, for example, as a metering pump, in a first fluid line 28, which leads from reservoir 12, especially from the inner volume area of the swirl pot 18, to an on-off valve 30. A second fluid line 32 leads from the on-off valve 30 to the first system area to be fed, i.e., to the vehicle heater 14 or optionally to a reformer or the like. A third fluid line 34 leads from the on-off valve 30 back to the reservoir 12 and to the swirl pot 18 and opens into the sucking jet pump 24. During the operation of the fuel pump 20 for the internal combustion engine and hence also during the operation of the sucking jet pump 24, this can take up liquid fuel contained in the third fluid line 34 and deliver it into the swirl pot 18.

The on-off valve 30, designed as a 3/2-way valve, can be switched over between two valve positions by actuation by an actuating device 36, which may also actuate, for example, the heater 14 and optionally also the fuel pump 20. In a first valve position recognizable in FIG. 1, the on-off valve 30 connects the first fluid line 28 to the second fluid line 32 and closes the third fluid line 34 in an essentially sealed manner. In a second switching position, the on-off valve 30 connects the second fluid line 32 to the third fluid line 34 and closes the first fluid line 28 in an essentially fluid-tight manner.

The operation of such a fluid supply system will be described below. It shall first be assumed for this that the on-off valve 30 is in the first valve position shown in FIG. 1 and a connection is established via the two fluid lines 28, 30 between the reservoir 12 and the first system area, i.e., the heater 14. A defined quantity of fluid can be delivered per unit of time at the reservoir 12 to the heater 14 during the operation of the fuel pump 26 in order to operate this heater, for example, with a defined heat output. At the same time, the fuel pump 20 for the internal combustion engine may also be operated in order to send fuel into the internal combustion engine via line 16 when this internal combustion engine shall be operated. With the fuel pump 20 operating, the two sucking jet pumps 22, 24 permanently deliver liquid fuel into the swirl pot 18 and thus ensure that a sufficient quantity of fuel B is always present in the volume area directly surrounding the fuel pump 20. At the same time, the sucking jet pump 24 sucks the third fluid line 34. However, since this line is closed by the on-off valve, no fuel is essentially returned from the third fluid line 34 into the swirl pot 18.

If the operation of the heater 14 is to be stopped, the feed of fuel is, in general, also ended for this. This means that the fuel pump 26 is stopped, so that no more fuel will flow at first in the direction of heater 14. With the fuel pump 20 operating for the internal combustion engine, the on-off valve 30 is then brought into its second valve position, in which it establishes a connection between the second fluid line 32 and the third fluid line 34. The liquid fuel contained in the two fluid lines 32, 34 is then sucked back essentially completely into the swirl pot 18 by the action of the sucking jet pump 24, so that these two fluid lines 32, 34 are emptied essentially completely. If this emptying is to take place during the phase during which an internal combustion engine is not being operated, the fuel pump 20 and, with this, the sucking jet pump 24, can be briefly put into operation to empty the two fluid lines 32, 34, doing so until it is ensured that at least the second fluid line 32 is completely emptied, while the third fluid line 34 does not necessarily have to be emptied completely. This may be set, for example, via the operating time preset at a known rate of delivery of the sucking jet pump 24.

To avoid gumming of the fuel pump 26 and of the on-off valve 30 during a longer stop period of the vehicle heater 14, the fuel pump 26 may be briefly operated, for example, after preset time intervals, with the second fluid line 32 at first emptied and optionally also with the third fluid line 34 emptied, in order to ensure that at least the first fluid line 28 up to the on-off valve 30 and also part of the second fluid line 32 are filled with fluid, i.e., fuel B. It is advantageous for this if the fuel uptake volume of the second fluid line 32 is greater than that of the first fluid line 28 with the fuel pump 26. To partially fill the second fluid line, the fuel pump 26 can then be operated until a volume that is somewhat greater than the volume of the first fluid line 28 will have been delivered with the fuel pump 26. It is ensured now that the quantity of fluid delivered is not yet large enough to escape to the heater 14.

After the fuel pump 26 has been stopped, the on-off valve 30 is then brought into its second valve position and the fuel pump 20 is again operated until at least the second fluid line 32 is emptied. The on-off valve 30 can thereafter be returned again into its first valve position and the operation of the fuel pump 20 can be ended.

If, in the stopped state, the fluid supply system 10 is consequently in a state in which at least the second fluid line 32 is completely emptied and the third fluid line 34 may possibly also be empty and the first fluid line is in an undefined state concerning the filling level, the fuel pump 26 may at first be operated again in a start-up phase of the heater 14, i.e., for example, during a preheating phase in the heater 14, in a predelivery operation, such that a quantity of fuel that ensures that at least the first fluid line 28 and the fuel pump 26 up to the on-off valve 30 are filled with fluid is delivered, and somewhat more fuel is ideally delivered, and part of the second fluid line 32 is thus filled as well. The on-off valve 30 is then again brought into the second valve position and it is again ensured by operating the fuel pump 20 that the second fluid line 32 will be completely emptied. The on-off valve 30 can then be returned immediately into its first valve position, so that it is ensured that the second fluid line 32 is completely emptied and the first fluid line 28 with the fuel pump 26 up to the on-off valve 30 is still completely filled in this state. The fuel pump 26 is operated thereafter, until a quantity of fuel that is sufficient to fill the volume of the second fluid line up to the discharge opening thereof at the heater 14 is delivered, taking into account the rate of delivery of said fuel pump 26. It is then ensured that the fluid supply system 10 is in a state for the next start of the vehicle heater 10 in which a now resuming or directly continuing operation of the fuel pump 26 leads directly to the entry of fuel into a combustion chamber or a porous evaporator medium in the vehicle heater 14. Time delays during the start-up phase, which would lead to an excessively long preglowing of, e.g., an ignition pin, can thus be avoided.

The fuel pump 26 in the fluid supply system 10 according to the present invention may be designed, for example, such that it can be recognized, for example, by observing the exciting current of a drive [of the fuel pump] whether this [pump] is delivering liquid fuel or air. In particular, if the fuel pump 26 is designed as a metering pump with a piston moving cyclically to and fro, the motion of said piston will vary greatly depending on whether it is delivering fuel or air, which correspondingly becomes recognizable in the coil current in an electromagnet arrangement for driving such a piston. If it is now recognized in such a system that air rather than fuel is being delivered during the start-up phase, the above-explained procedure for the defined prefilling at least up to the on-off valve 30 and then refilling up to the end of the fuel line 32 can be repeated once or possibly several times in order to ensure that no air is delivered into the vehicle heater 14, which could lead to burning away of the flame already during the start-up phase.

The present invention utilizes a fluid supply system of a very simple design in a vehicle, in which, in particular, the fuel pump for delivering fuel to an internal combustion engine, which is, in general, already present, is also used to guarantee a defined emptying of the line leading to a vehicle heater or to another system area to be fed with liquid fuel. Leaks from the supply lines, which may possibly occur, can thus be compensated before the vehicle heater or the like is put into operation.

While a specific embodiment of the invention has been described in detail to illustrate the application of the principles of the invention, it will be understood that the invention may be embodied otherwise without departing from such principles.

What is claimed is:

1. A fluid supply system for delivering liquid hydrocarbon to a fuel-operated vehicle heater or to a reformer, the fluid supply system comprising:
   a fluid reservoir;
   an on-off valve;
   a first fluid line from the fluid reservoir to the on-off valve;
   a second fluid line from the on-off valve to a first system area to be fed with fluid;
   a third fluid line from the on-off valve to the reservoir, wherein the on-off valve establishes a connection between the first fluid line and the second fluid line in a first valve position and establishes a connection between the second fluid line and the third fluid line in a second valve position;
   a first fluid delivery arrangement for delivering fluid from the reservoir into the second fluid line; and
   a second fluid delivery arrangement for delivering fluid from the third fluid line into the reservoir, said second fluid delivery arrangement comprising a sucking jet pump.

2. A fluid supply system in accordance with claim 1, wherein the first fluid delivery arrangement is arranged in the first fluid line.

3. A fluid supply system in accordance with claim 1, wherein the first fluid delivery arrangement comprises a metering pump.

4. A fluid supply system in accordance claim 1, wherein the second fluid delivery arrangement takes up fluid from the third fluid line and releases the fluid into the reservoir.

5. A fluid supply system in accordance claim 1, wherein at least the second fluid delivery arrangement is arranged in the reservoir.

6. A fluid supply system in accordance with claim 1, wherein the second fluid delivery arrangement comprises a main fluid delivery pump for delivering fluid from the reservoir to a second system area to be fed with fluid, wherein the sucking jet pump delivers fluid from the third fluid line into the reservoir during the operation of the main fluid delivery pump.

7. A process for operating a fluid supply system, the process comprising:
   providing a fluid supply system comprising a fluid reservoir, an on-off valve, a first fluid line from the fluid reservoir to the on-off valve, a second fluid line from the on-off valve to a first system area to be fed with fluid, a third fluid line from the on-off valve to the reservoir, wherein the on-off valve establishes a connection between the first fluid line and the second fluid line in a first valve position and establishes a connection between the second fluid line and the third fluid line in a second valve position, a first fluid delivery arrangement for delivering fluid from the reservoir into the second fluid line and a second fluid delivery arrangement comprising a sucking jet pump for delivering fluid from the third fluid line into the reservoir;

bringing the on-off valve into the first valve position; and operating the first fluid delivery arrangement for delivering fluid to the first system area.

8. A process in accordance with claim 7, wherein after the ending of the delivery of fluid to the first system area, the on-off valve is brought into the second valve position and the second fluid delivery arrangement is operated to empty at least the second fluid line.

9. A process in accordance with claim 8, wherein the on-off valve is brought into the first valve position after emptying the second fluid line.

10. A process in accordance with claim 7, further comprising the following steps taken before delivering fluid to the first system area with the on-off valve having been brought into the first valve position:

a) operating the first fluid delivery arrangement until the first fluid line is filled with fluid up to the on-off valve and part of the second fluid line is filled with fluid;

b) bringing the on-off valve into the second valve position, and operating the second fluid delivery arrangement until at least the second fluid line is emptied essentially completely; and c) bringing the on-off valve into the first valve position, and operating the first fluid delivery arrangement until the second fluid line is filled with fluid essentially completely.

11. A process in accordance with claim 10, wherein after performing measure c), the first fluid delivery arrangement is operated after an interruption of operation or continuously in order to feed fluid from the second fluid line into the first system area.

12. A fluid supply system comprising:

a fluid reservoir;

a multi position valve movable between a first valve position and a second valve position;

a first fluid line from the fluid reservoir to the on-off valve;

a second fluid line from the on-off valve to a first system area to be fed with fluid;

a third fluid line from the on-off valve to the reservoir, wherein in the first valve position the valve establishes a connection between the first fluid line and the second fluid line and in the second valve position the valve establishes a connection between the second fluid line and the third fluid line;

a first fluid delivery arrangement for delivering fluid from the reservoir into the second fluid line; and a second fluid delivery arrangement for delivering fluid from the third fluid line into the reservoir, said second fluid delivery arrangement comprising a sucking jet pump.

13. A fluid supply system in accordance with claim 12, wherein the first fluid delivery arrangement is arranged in the first fluid line.

14. A fluid supply system in accordance with claim 13, wherein the first fluid delivery arrangement comprises a metering pump.

15. A fluid supply system in accordance claim 13, wherein the second fluid delivery arrangement takes up fluid from the third fluid line and releases the fluid into the reservoir.

16. A fluid supply system in accordance claim 15, wherein at least the second fluid delivery arrangement is arranged in the reservoir.

17. A fluid supply system in accordance with claim 12, wherein the second fluid delivery arrangement comprises a main fluid delivery pump for delivering fluid from the reservoir to a second system area to be fed with fluid, wherein the sucking jet pump delivers fluid from the third fluid line into the reservoir during the operation of the main fluid delivery pump.

* * * * *